United States Patent [19]

Lu et al.

[11] Patent Number: 4,853,267

[45] Date of Patent: Aug. 1, 1989

[54] EASY OPEN CLOSURE SYSTEM

[75] Inventors: Shih-Lai Lu; Andrew H. Wong, both of St. Paul, Minn.

[73] Assignee: Minnesota Mining and Manufacturing Company, St. Paul, Minn.

[21] Appl. No.: 578,651

[22] Filed: Feb. 9, 1984

[51] Int. Cl.$^4$ .................. B65D 17/34; C08G 18/30
[52] U.S. Cl. .................. 428/35.7; 220/260; 428/423.1; 528/80; 528/83; 528/84
[58] Field of Search .............. 220/258, 260, 271; 428/35, 35.7, 423.1; 528/80, 83, 84

[56] References Cited

U.S. PATENT DOCUMENTS

| | | | |
|---|---|---|---|
| 3,246,049 | 4/1966 | Webber | 528/83 |
| 3,538,055 | 11/1970 | Camilleri et al. | 528/83 |
| 4,206,299 | 6/1980 | Yamazaki et al. | 528/288 |
| 4,215,791 | 8/1980 | Brochman | 220/260 |
| 4,323,491 | 4/1982 | Veselovsky | 524/144 |
| 4,336,298 | 6/1982 | Schwarz | 428/287 |
| 4,373,082 | 2/1983 | Kimball et al. | 528/60 |
| 4,378,074 | 3/1983 | Brochman | 220/260 |
| 4,389,519 | 6/1983 | Yamazaki et al. | 528/73 |
| 4,412,033 | 10/1983 | La Belle et al. | 528/58 |
| 4,419,476 | 12/1983 | Coughlin et al. | 524/356 |

*Primary Examiner*—Ellis P. Robinson
*Assistant Examiner*—James J. Seidleck
*Attorney, Agent, or Firm*—Donald M. Sell; Walter N. Kirn; Gerald F. Chernivec

[57] ABSTRACT

An end portion for a container having a preformed opening therein and an easy-open closure system therefor, the closure system comprising an exterior tape over the opening which is manually removable, the tape being adhered by an adhesive which comprises the reaction mixture of an aryl isocyanate, an aliphatic glycol, and a defined mixture of hydroxy terminated polyesters.

12 Claims, No Drawings

EASY OPEN CLOSURE SYSTEM

TECHNICAL FIELD

This invention relates to containers having preformed openings or pour holes therein which are sealed by flexible, tape-based closure assemblies. The invention more specifically relates to an adhesive for use with such assemblies.

BACKGROUND ART

There is and has been increasing use of metal containers for carbonated beverages such as soft drinks and beer. One of the earlier and most common of these containers employed an easy open closure wherein a metal ring attached to the end wall at a portion thereof which had weakened tear lines was easily lifted and pulled away therefrom, removing the portion of the end wall defined by the tear lines. Such closures have become ecologically unacceptable because the removed metal tabs are commonly discarded on the ground or in lakes. Such tabs decompose extremely slowly and, because of their sharp edges, can be dangerous.

A more recent development again utilizes weakened tear lines in the end portion of a container, but is designed to retain the closure with the container. In this instance, the metal tab remains with the end portion of the can itself after manually opening. However, any dirt and/or debris which is contained on the can end is pushed into the container during opening, because the portion of the end wall defined by the tear lines is in fact inserted into the can during opening, thus contacting the contents thereof.

It is known that unpressurized cans containing items such as tomato juice, orange juice and similar liquids can be provided with easy open closures utilizing pressure-sensitive adhesive tape tabs, such as are disclosed in U.S. Pat. No. 3,389,827. However, such closure systems have not been found acceptable for use in connection with containers in which are packaged gas-containing liquids, such as carbonated soft drinks and beer. The pressure buildup in such systems can ordinarily cause tape closures to bulge upward and gradually peel away from the area immediately adjacent the preformed opening or pour hole, whereby the can seal becomes broken.

Furthermore, when utilizing containers which enclose lubricious materials, such as motor oil, the extreme variation in temperature under which such containers are stored and used has presented significant problems when attempting to utilize easy open closure systems.

A number of patents purport to disclose various easy open closure systems which are asserted to be useful in conjunction with containers having carbonated beverages therein. Examples include U.S. Pat. Nos. 2,870,935, 3,292,828 and 3,339,788. An improvement patent over these earlier systems is U.S. Pat. No. 3,990,603, but in all of the foregoing cases, the easy open systems disclosed therein have met with only limited commercial success.

One major problem encountered in the development of such closures is the utilization of materials having sufficient physical properties to form a seal under the conditions encountered in the filling and closing of metal containers. With any of these prior closures, especially when applications involving carbonated beverages, it has been difficult to obtain an adhesive capable of meeting the stringent requirements of ready application to a container end, retention of the elevated pressure within the container, and easy opening characteristics.

We have now discovered an adhesive system which is capable of eliminating the foregoing deficiencies and providing an easy open closure system which is functional both for containers containing carbonated liquids and those containing lubricious materials such as motor oils, which of necessity must be operable over wide temperature variations.

SUMMARY OF THE INVENTION

In accordance with the present invention, there is provided an end portion for a container, wherein the end portion has a preformed opening, i.e., a pour hole and an easy open closure system for the opening, the closure system comprising an exterior tape circumjacent, i.e., over and surrounding the opening, the tape being peelable by hand from the exterior of the end portion surrounding the opening, the tape typically comprising a flexible backing member and a uniform adhesive coating which is firmly anchored to the backing member, the adhesive comprising the reaction mixture of an aryl isocyanate, an aliphatic glycol, and a mixture of hydroxy terminated polyesters, the mixture of polyesters comprising at least one low molecular weight hydroxy terminated polyester, the molecular weight thereof being from about 750 to about 1,250, and at least one high molecular weight hydroxy terminated polyester, the molecular weight thereof being from about 1,700 to about 2,400, wherein the ratio of the low molecular weight polyester to the high molecular weight polyester being from about 4:1 to about 0.25:1.

In closure systems for carbonated liquids, there also is usually present an interior sheet material which covers the underside of the can opening and which is firmly adhered to the bottom surface of the end portion circumjacent the opening and is also adhesively secured to the exterior tape in the area of the opening, the interior sheet material typically comprising a backing member and an adhesive layer. At least one of the exterior tape or the interior sheet material should be moisture-impervious, and the pre-formed opening typically has a pressure-relief opening associated therewith.

The adhesive of our invention can also be utilized with systems such as are disclosed in U.S. Pat. No. 4,215,791, wherein no adhesive is contained on the outer backing member, only on the interior sheet material.

Accordingly, our invention thus provides an easy open closure system capable of maintaining a seal in a pressurized container, or one containing a lubricious material, and yet allows for easy and safe manual opening of the container. Further, the closure system imparts no undesirable tastes, flavors or odors to carbonated beverages. The closure system is useful with both steel and aluminum can ends, thereby enhancing the economics of recyclability, and the system is economically competitive with existing closure systems. Furthermore, the instant closure system is compatible with presently utilized canning equipment, and is also ecologically acceptable.

DETAILED DESCRIPTION OF THE INVENTION

The backing member of the exterior tape has been extensively defined in other patents, notably U.S. Pat.

Nos. 3,990,603, 4,215,791, 4,378,074 and 4,405,056, all incorporated herein by reference.

Representative materials which have been found suitable as backing members include tough plastic films which have been conventionally oriented and heat-set to impart requisite properties of toughness and temperature resistance, such as poly-1,4-butylene terephthalate and polyethylene terephthalate. Other suitable exemplary films include polycarbonate, composite plastic films and soft metal, an example of which is dead-soft aluminum. Especially preferred is polycarbonate.

Those backing materials which are plastic can be vapor coated with a thin layer of metal, e.g., aluminum, etc. to provide opacity and can also improve the impermeability of some backings. Opacity can also be obtained through use of a pigment, either coated onto the backing or blended with the backing during the manufacture thereof.

The specific adhesives which have found utility in our invention are polyurethane-based materials which comprise the reaction product of an aryl diisocyanate, an aliphatic glycol and a mixture of hydroxy terminated polyesters.

While any aryl diisocyanate may be employed as part of the reaction mixture to form our polyurethane, diphenyl diisocyanates are preferred. For example, mixed isomeric diphenyl methane diisocyanates; diphenyl methane-p,p'-diisocyanate; dichlorodiphenyl methane diisocyanate and the like, are exemplary. Diphenyl methane-p,p'-diisocyanate provides excellent results.

In conventional fashion, an aliphatic glycol is typically added as a chain extender. Such materials typically contain between 4 and 10 carbon atoms, examples of which include butane diol-1,4; hexamethylene diol-1,6; octamethylene diol-1,8 and the like. In general, the chain extending glycol is preferably of the formula $HO(CH_2)_xOH$, wherein x may be from 2 to 10 and preferably from 4 to 8. Butane diol-1,4 is particularly preferred.

The last necessary component is a mixture of hydroxyl terminated polyesters, such as poly(tetramethylene adipate) glycol, poly(caprolactone) glycol, poly(hexamethylene carbonate) glycol, and the like. The first polyester should have a molecular weight of from about 750 to about 1250, with from about 900 to about 1100 being preferred, and about 1000 most preferred. The second polyester should have a molecular weight from about 1700 to about 2400, with from about 1800 to about 2200 being preferred, and about 2000 most preferred. The polyesters should be mixed at from about four parts to about 0.25 part of low molecular weight per part of high molecular weight, with from about 3:1 to 0.33:1 being preferred. The optimum ratio has been found to be 1:1.

Preferred hydroxyl terminated polyesters have an acid number of less than about 10, and preferably less than about 3. The polyesters are conventionally prepared by an esterification reaction of an aliphatic dibasic acid or anhydride thereof with a diol. Molar ratios of more than one diol to acid are preferred so as to obtain linear groups containing a preponderance of terminal hydroxyl groups.

Useful polyesters include those prepared from the esterification of dicarboxylic acids, such as adipic, succinic, pimelic, suberic, azelaic, sebacic and the like or their anhydrides. Preferred acids are those dicarboxylic acids of the formula HOOC—R—COOH, where R is an alkylene radical containing 2 to 8 carbon atoms. More preferred are those represented by the formula $$HOOC(CH_2)_xCOOH$$

where x is a number from 2 to 10. Adipic acid is most preferred.

Diols utilized in the preparation of the polyesters are preferably straight chain diols of the formula $HO(CH_2)_xOH$, wherein x may be 2 to 10, but preferably is 4 to 8. Examples include butanediol-1,4, hexamethylenediol-1,6, octamethylenediol-1,8 and the like, with butanediol-1,4 being particularly preferred.

The manufacture of the polyurethanes is conventional, and, for example, is disclosed in U.S. Pat. No. 3,493,634, incorporated herein by reference.

In the polyurethane manufacture, there should be present from about 1.0 to about 2.1 moles of aliphatic glycol and about 2.0 to about 3.1 moles of aryl isocyanate per mole of total polyester present, with from 1.1 to 2.0 of the glycol and 2.1 to 3.0 of the isocyanate being preferred, and about 1.6 and 2.6 of the glycol and isocyanate, respectively, being most preferred.

As the amount of the lower molecular weight hydroxyl terminated polyster is increased, the glass transition temperature (Tg) of the resultant polyurethane increases, which correspondingly reduces the low temperature characteristics thereof, while increasing the concentration of the higher molecular weight polyester will tend to improve the cold temperature characteristics of the polyurethane, but can increase the tendency for crystallization.

It has been found that the Tg of the polyurethane should be lower than about $-30°$ C. to ensure the desired cold temperature characteristics of the adhesive. (Tg is measured by conventional techniques, including differential scanning calorimetry and differential thermal analysis.)

The crystallization temperature (Tc) should be unattainable when measured by the foregoing analytical techniques. If a Tc is found in the thermogram, aging of the adhesive, i.e., the adhesive characteristics with age may be adversely affected.

The weight average molecular weight, as determined by gel permeation chromatography (GPC) should preferably be greater than about 90,000 to insure attainment of the desired adhesive performance and manufacturing characteristics.

Adhesion values of the adhesive vary depending on the enamel coating on the can end closure. Increased adhesion typically results in a reduced bonding time and temperature necessary for preparing the closure, and thus an increase in machine speed.

The adhesive is applied to the backing by conventional techniques, e.g., solvent casting, extrusion, and the like.

If an internal sheet material is utilized, the characteristics thereof are critical to proper operation of the closure system, i.e., where carbonated beverages are concerned. In function, the interior sheet material must be capable of resisting rupture and tear propagation resulting from gas pressure in a filled container, while also allowing easy and complete removal thereof from the area of the pour hole when the exterior tape is stripped from the filled container. Therefore, the interior sheet material must have properties of resisting tear and rupture when the container is filled and yet will allow easy and clean tearing around the pour hole periphery when tear is initiated by removal of the exterior tape, as are clearly disclosed in prior patents discussed above.

Materials having been found suitable as backing members for the interior sheet material include plastic films such as polyethylene terephthalate, unplasticized polyvinyl chloride, and films derived from a graft copolymer comprising acrylonitrile/methylacrylate copolymer grafted onto an acrylonitrile/butadiene copolymer backbone. A particularly useful graft copolymer is formed by graft polymerizing acrylonitrile and methylacrylate in the presence of an acrylonitile/butadiene copolymer.

One particularly useful composite film comprises a layer of polyethylene terephthalate and a layer of polyethylene terephthalate/polyethylene isophthalate copolymer, preferably prepared by coextrusion, as taught in U.S. Pat. No. 3,871,947, incorporated herein by reference.

In the manufacture of the closure systems, metal end portions for containers, having been coated with a thin lacquer or enamel by the can end manufacturer, are typically punched in order to provide a pour hole. Then, the exterior tape and the interior sheet material, if required, are affixed circumjacent the pre-formed opening in the end portion using both heat and moderate pressure. Generally speaking, the pressure used to affix the exterior tape and the interior sheet material to the can end is relatively uniform around the periphery of the pour hole and in the area of the pour hole itself where the exterior tape is firmly bonded or secured to the interior sheet material.

What is claimed is:

1. In a container sealed by means of a tape closure, the improvement which comprises the use of a polyurethane adhesive to seal said closure, said polyurethane adhesive comprising the non-crystallizable reaction product of an aryl isocyanate, an aliphatic glycol, and a mixture of hydroxy terminated polyesters, said mixture of polyesters comprising a low molecular weight polyester, the molecular weight thereof being from about 750 to about 1,250 and a high molecular weight polyester, the molecular weight thereof being from about 1,700 to about 2,400, the ratio of said low molecular weight polyester to said high molecular weight polyester being from about 4:1 to about 0.25:1.

2. The container of claim 1 additionally containing an interior sheet material adhesively bonded to said tape.

3. The container of claim 1 wherein said adhesive was a Tg of less than about $-30°$ C.

4. The container of claim 1 wherein said adhesive has a weight average molecular weight of at least about 90,000.

5. The container of claim 1 wherein said ratio is from about 3:1.0 to about 0.33 to 1.0.

6. The container of claim 1 wherein said ratio is from about 1:1.

7. The container of claim 1 wherein said aryl diisocyanate is a diphenyl diisocyanate.

8. The container of claim 7 wherein said diphenyl diisocyanate is diphenyl methane-p,p'-diisocyanate.

9. The container of claim 1 wherein said aliphatic glycol is butane diol-1,4.

10. The container of claim 1 wherein said hydroxy terminated polyesters have an acid number of less than about 10.

11. The container of claim 1 wherein at least one of said polyesters comprise the esterification product of adipic acid and butane diol-1,4.

12. The container of claim 1 wherein said adhesive has from about 1.0 to about 2.1 moles of aliphatic glycol and from about 2.0 to about 3.1 moles of isocyanate per mole of total polyester.

* * * * *